(12) United States Patent
Gilbert et al.

(10) Patent No.: US 10,795,953 B2
(45) Date of Patent: *Oct. 6, 2020

(54) METHODS AND SYSTEMS FOR SOCIAL NETWORK BASED CONTENT RECOMMENDATIONS

(71) Applicant: eBay Inc., San Jose, CA (US)

(72) Inventors: Michael Gilbert, Seattle, WA (US); Elizabeth Churchill, San Francisco, CA (US)

(73) Assignee: eBay Inc., San Jose, CA (US)

( * ) Notice: Subject to any disclaimer, the term of this patent is extended or adjusted under 35 U.S.C. 154(b) by 222 days.

This patent is subject to a terminal disclaimer.

(21) Appl. No.: 15/803,100

(22) Filed: Nov. 3, 2017

(65) Prior Publication Data

US 2018/0052938 A1 Feb. 22, 2018

Related U.S. Application Data

(63) Continuation of application No. 14/553,853, filed on Nov. 25, 2014, now Pat. No. 9,817,903.

(51) Int. Cl.
*G06F 16/9535* (2019.01)
*G06F 16/245* (2019.01)
*G06F 16/2457* (2019.01)

(52) U.S. Cl.
CPC ........ *G06F 16/9535* (2019.01); *G06F 16/245* (2019.01); *G06F 16/24578* (2019.01)

(58) Field of Classification Search
None
See application file for complete search history.

(56) References Cited

U.S. PATENT DOCUMENTS

| | | | |
|---|---|---|---|
| 6,266,649 B1 | 7/2001 | Linden et al. | |
| 6,976,066 B1 * | 12/2005 | Mouhanna | H04L 41/0803 709/217 |
| 8,909,646 B1 | 12/2014 | Fabrikant et al. | |
| 9,223,879 B2 | 12/2015 | Narayanan et al. | |
| 9,817,903 B2 * | 11/2017 | Gilbert | G06F 16/9535 |
| 10,269,021 B2 * | 4/2019 | Levy | G06Q 30/00 |
| 2007/0294289 A1 | 12/2007 | Farrell | |
| 2015/0370798 A1 | 12/2015 | Ju et al. | |

(Continued)

OTHER PUBLICATIONS

First Action Interview Office Action received for U.S. Appl. No. 14/553,853, dated Mar. 6, 2017, 6 pages.

(Continued)

*Primary Examiner* — Uyen T Le
(74) *Attorney, Agent, or Firm* — Holland & Hart LLP

(57) ABSTRACT

Systems and methods are presented for generating recommendations using multi-level social network analysis of user behavior. In some embodiments, the system receives a set of user interactions, from a plurality of users, performed on a set of data objects; generates a set of associations between the set of data objects; and identifies a set of data object clusters indicative of the set of associations. The system generates an organization of the set of data objects based on the set of associations and the set of data object clusters and causes presentation of a plurality of data objects of the set of data objects on a user interface of a user device based on the organization.

20 Claims, 7 Drawing Sheets

(56) References Cited

U.S. PATENT DOCUMENTS

2016/0063116 A1   3/2016   Abuelsaad et al.
2016/0147892 A1   5/2016   Gilbert et al.

OTHER PUBLICATIONS

Notice of Allowance received for U.S. Appl. No. 14/553,853, dated Jul. 13, 2017, 10 pages.
Pre-Interview First Office Action received for U.S. Appl. No. 14/553,853, dated Nov. 30, 2016, 4 pages.
Response to First office Action Interview—Office Action filed on May 8, 2017 for U.S. Appl. No. 14/553,853, dated Mar. 6, 2017, 11 pages.
Rana et al., "Dynamic Media Distribution in Ad-hoc Social Networks", Second International Conference on Cloud and Green Computing, 2012, 8 pages.
U.S. Appl. No. 14/553,853, Response filed Jan. 30, 2017 to First Action Interview—Pre-Interview Communication dated Nov. 30, 2016, 4 pages.

* cited by examiner

METHODS AND SYSTEMS FOR SOCIAL NETWORK BASED CONTENT RECOMMENDATIONS

CLAIM OF PRIORITY

This application claims the benefit of priority of U.S. application Ser. No. 14/553,853, filed Nov. 25, 2014, which is hereby incorporated by reference in its entirety.

TECHNICAL FIELD

The subject matter disclosed herein generally relates to the processing of data. Specifically, the present disclosure addresses social network based content recommendations based on user behavior.

BACKGROUND

Social networks provide a forum for interconnecting, forming relationships, maintaining relationships, and communicating. The relationships modeled by social networks can include friendships, kinships, common interests, common pursuits, common habits, and the like. Social network systems can include recommendation systems for comparing characteristics of social network users and making recommendations for users based on a commonality of characteristics of the user and the subject of the recommendation.

Some recommendation systems rely on a user of the social network making a selection and then recommending to the user other selections made by other users of the social network. Other recommendation systems rely on calculating correlation values between specific characteristics of items to determine recommendations. Current recommendations systems, relying on these correlation values generate a result list of recommendations deemed, where the user is searching for a specific item or purchase. These recommendation systems often fail to provide recommendation sets that are both contextually appropriate and expansive in relation to a user query for experiential users, for whom browsing, engagement, and entertainment are motivators.

BRIEF DESCRIPTION OF THE DRAWINGS

Some embodiments are illustrated by way of example and not limitation in the figures of the accompanying drawings.

DETAILED DESCRIPTION

Figure 1:
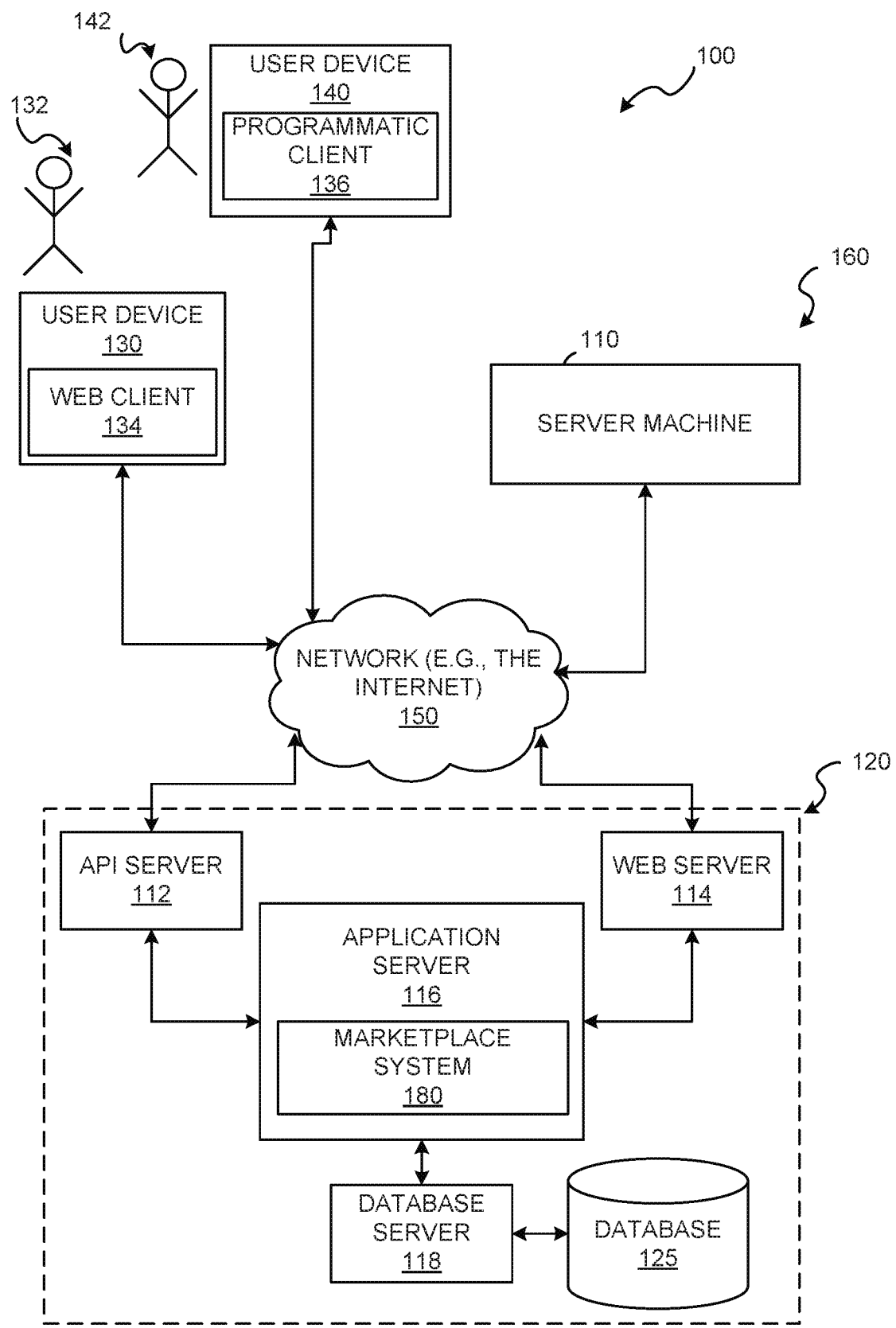
FIG. 1 is a network diagram illustrating a network environment suitable for matching buyers and sellers using calibrated user profiles and notification models, according to some example embodiments.

Example methods and systems are directed to generating recommendations using multi-level social network analysis of user behavior within individual category areas and user behavior across the social network across multiple category areas and products. By integrating social network analysis into the methods and systems disclosed for generating recommendations, content recommendations can be at least partially based on an entire ecosystem of users' actions and activities within the system. The recommendations based on multi-level social network analysis can be contextually appropriate, and yet expansive based upon the analysis applied to the social network, the categories, and user input. The multi-level social network analysis can allow users to view not only items in which they have recently expressed interest, but the results of the entire network of users' items and categories. In some embodiments, the results produced from the network of users' items and categories may be related to the items in which the user has expressed interest, as determined by one of a plurality of algorithms or the multi-level social network analysis of the behavior of the users of the social network.

Recommendations can undergo a plurality of phases to create a personalized recommendation list. For example, recommendations can undergo three phases to create a personalized rank ordered list of content delivered to each user. In some example embodiments, the system and methods disclosed herein can create an ego-centric bipartite social network graph, created for each user within the ecosystem, the system described in detail below. The ego-centric bipartite social network graph can include all interactions with data objects on the system to constitute a completely connected network for each user. The data objects for all users' individual ego-centric graphs can be clustered, resulting in a categorized global content network. Results can then be placed in a rank-ordered list, determined through tie-strength analysis of those interactions and delivered to the user, weighting results with the target user's own ego-centric graph.

The phases can include graph creation, graph clustering, and graph ranking. The method by which the personalized recommendation list is generated can be a hybrid recommendation algorithm creating social network graphs of user interactions or metadata. The hybrid recommendation algorithm can cluster the graphs to create content, context, or time specific groupings. The clusters and the items within the graphs can be ranked to deliver discrete lists (e.g., the personalized recommendation list) of results to a user. The algorithm can manipulate the ranking and clustering in order to provide an expansive or a targeted browsing experience.

In some embodiments, methods and systems are directed to organizing sets of data objects networked, at least in part based on the multi-level social network analysis, and presenting data objects from the sets of data objects. The multi-level social network analysis can be used to form interrelations, such as the graph creation, graph clustering, and graph ranking, which can be used to inform or structure additional user interactions with the system or with the social network. In some embodiments, the data objects selected for organization and presentation can be selected or determined, at least in part, through user input, such as a query.

For example, in some embodiments, methods and systems of the present disclosure can receive user interactions from users of one or more social networks. The user interactions may be performed on a set of data objects, such as items in a publication system or a marketplace system. The methods and systems can generate a set of associations between the set of data objects. For example, the associations can be embodied as a graph, such as a completely connected graph, or a set of graphs, such as a set of completely connected graphs which include at least one connection between each of the graphs of the set of graphs. The methods and systems can identify a set of data object clusters indicative of the set of associations. For example, the set of data object clusters can be generated through graph clustering. The methods and systems can generate an organization for the set of data objects, and present a plurality of data objects of the set of data objects for display.

Examples merely typify possible variations. Unless explicitly stated otherwise, components and functions may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

FIG. 1 is a network diagram illustrating a network environment 100 suitable for generating recommendations using multi-level social network analysis of user behavior within individual category areas and user behavior across the social network and across multiple category areas and products. The network environment 100 includes a server machine 110, a publication system 120, and user devices 130 and 140, all communicatively coupled to each other via a network 150. The server machine 110, explained in more detail with reference to FIG. 2, can form all or part of a network-based system 160 configured to receive a set of user interactions performed on a set of data objects, generate a set of associations between the set of data objects, identify a set of data object clusters, generate an organization for the set of data objects, and present a plurality of data objects for display.

Although shown as separate from the publication system 120, in some embodiments, the server machine 110 can be included in the publication system 120 as a portion thereof. For example, the server machine 110 can form one or more hardware components in communication with other components of the publication system 120. In some embodiments, the server machine 110 could form one or more components of the publication system 120, implemented as a combination of hardware and software. For example, software forming a portion of the publication system 120 can include processor executable instructions which configure a processor of the publication system to perform operations of the server machine 110 described herein.

The publication system 120 is shown as including an application programming interface (API) server 112, a web server 114, an application server 116, a database server 118, and the database 125. In some embodiments, the publication system 120 forms all or part of the network-based system 160 (e.g., a cloud-based server system configured to provide one or more services to the user devices 130 and 140). The server machine 110, the publication system 120, and the user devices 130 and 140 may each be implemented in a computer system, in whole or in part, as described below with respect to FIG. 6. The API server 112 provides a programmatic interface by which the user device 130 and 140 can access the application server 116 of the publication system 120

The application server 116 may be implemented as a single application server 116 or a plurality of application servers. The application server 116, as shown, hosts a marketplace system 180, which comprises one or more modules or applications and which may be embodied as hardware, software, firmware, or any combination thereof. The application server 116 is, in turn, shown to be coupled to the database server 118 that facilitates access to one or more information storage repositories or databases, such as the database 125.

The marketplace system 180 provides a number of marketplace functions and services to users that interface with the network-based system 160. For example, the marketplace system 180 provides information for products for sale or at auction facilitated by the marketplace system 180 and displayable on the user devices 130 and 140. In some embodiments, the marketplace system 180 provides listings which contain information for the products. The listings for products can be stored in the database 125 and may be searchable through the network-based system 160. The listings may include information indicative of a product, a condition of the product, terms of sale for the product, shipping information, a description of the product, a quantity, metadata associated with the product, metadata associated with coding for the listing, and information indicative of product organization, such as titles, categories, category taxonomies, and product interrelations. The marketplace system 180 can also facilitate the purchase of products in the online marketplace that can later be delivered to buyers via shipping or any conventional method.

While the marketplace system 180 is shown in FIG. 1 to form a part of the network-based system 160, it will be appreciated that, in some embodiments, the marketplace system 180 may form part of a payment service that is separate and distinct from the network-based system 160. Alternatively, the marketplace system 180 may form part of a payment service that is a part of the networked-based system 160. Further, while the client-server-based network environment 100 shown in FIG. 1 employs a user-server architecture, the present disclosure is not limited to such architecture, and may equally well find application in a distributed architecture system (e.g., peer-to-peer), for example. The marketplace system 180 may also be implemented as standalone software programs, which do not necessarily have network capabilities.

The database server 118 is coupled to the database 125 and provides access to the database 125 for the user devices 130 and 140 and other components of the server machine 110. The database 125 can be a storage device that stores information related to products; documents; web sites; metadata relating to products, documents, or websites; and the like.

Also shown in FIG. 1 are users 132 and 142. One or both of the users 132 and 142 can be a human user (e.g., a human being), a machine user (e.g., a computer configured by a software program to interact with the user device 130), or any suitable combination thereof (e.g., a human assisted by a machine or a machine supervised by a human). The user 132 is not part of the network environment 100, but is associated with the user device 130 and is a user of the user device 130. For example, the user device 130 can be a desktop computer, a vehicle computer, a tablet computer, a navigational device, a portable media device, a smartphone, or a wearable device (e.g., a smart watch or smart glasses) belonging to the user 132. Likewise, the user 142 is not part of the network environment 100, but is associated with the user device 140. As an example, the user device 140 can be a desktop computer, a vehicle computer, a tablet computer, a navigational device, a portable media device, a smartphone, or a wearable device (e.g., a smart watch or smart glasses) belonging to the user 142. Although described as outside of the network environment 100, the network environment can be understood to include data representing an aggregation of user behaviors communicated through user devices associated with the users.

The user device 130 contains a web client 134 which may access the marketplace system 180 and, in some cases, the server machine 110, via the web interface supported by the web server 114. Similarly, a programmatic client 136 is configured to access the various services and functions provided by the marketplace system 180 and, in some cases, the server machine 110, via the programmatic interface provided by the API server 112. The programmatic client 136 may, for example, perform batch-mode communications between the programmatic client 136, the networked-based system 160, and the server machine 110. Although the user device 130 is shown with the web client 134 and the user device 140 is shown with the programmatic client 136, it should be understood that both the user device 130 and the user device 140 may each include instances of the web client 134 and the programmatic client 136 specific to the user device 130 or 140 containing the client.

Any of the machines, databases, or devices shown in FIG. 1 may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 6. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 150 may be any network that enables communication between or among machines, databases, and devices (e.g., the server machine 110 and the user device 130). Accordingly, the network 150 can be a wired network, a wireless network (e.g., a mobile or cellular network), or any suitable combination thereof. The network 150 can include one or more portions that constitute a private network, a public network (e.g., the Internet), or any suitable combination thereof. Accordingly, the network 150 can include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 150 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
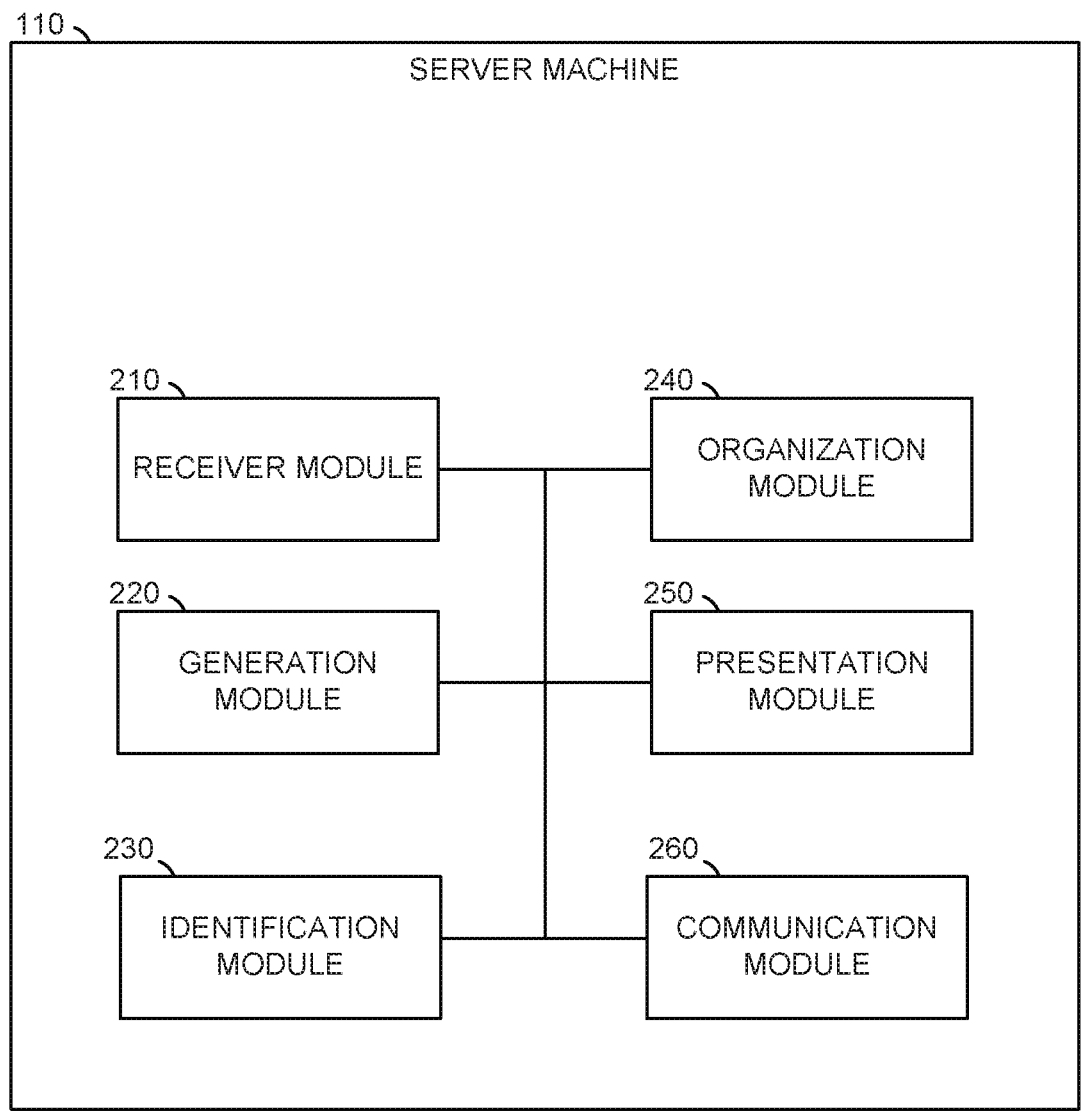
FIG. 2 is a block diagram illustrating components of a server machine suitable for generating calibrated user profiles and notification models, according to some example embodiments.

FIG. 2 is a block diagram illustrating components of the server machine 110, according to some example embodiments. The server machine 110 is shown as including a receiver module 210, a generation module 220, an identification module 230, an organization module 240, a presentation module 250, and a communication module 260 all configured to communicate with each other (e.g., via a bus, shared memory, or a switch). Any one or more of the modules described herein may be implemented using hardware (e.g., one or more processors of a machine) or a combination of hardware and software. For example, any module described herein may configure at least one processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The receiver module 210 receives sets of user interactions from a plurality of users e.g., the user 132, the user 142, and other users). The sets of user interactions may be performed on a set of data objects. The sets of user interactions are received by the server machine 110 via the receiver module 210. The sets of user interactions can include or comprise data representative of selections of the user 132 or 142 with respect to the data published by the publication system 120. The data representative of the interactions can include one or more interrupt caused by the user 132 or 142 interacting with a touch screen of the user device 130 or 140, a mouse, a keyboard, or other input device capable of enabling user interaction with a user interface of the user device 130 or 140. The receiver module 210 can receive the one or more selections via communication between the user device 130 or 140 and the communication module 260.

The generation module 220 generates a set of associations between data objects of the set of data objects. Each association may be identified among two or more data objects between a first data object and a second data object) of the set of data objects. The associations may be indicative of user interactions performed on each of the two or more data Objects. For example, the generation module 220 can generate a first set of associations among a first set of data objects and generate a second set of associations among or between the second set of data objects. Further, the generation module 220 can generate a third set of associations between the first set of data objects and the second set of data objects.

The generation module 220 can comprise a hardware module, described below in more detail. By way of example, in some embodiments, the generation module 220 can comprise a hardware processor configured to perform the operations relating to the generation of sets of associations among data objects of the set of data objects. The operations for generating the associations among the data objects are described below in more detail.

The identification module 230 identifies a set of data object clusters indicative of associations of the set of associations among or between data objects of the set of data objects. The identification module 230 can perform graph clustering to identify data object clusters. The data object clusters can be indicative of associations of the set of associations among the data objects.

The organization module 240 can generate an organization for the set of data Objects based on the set of associations and the set of data object clusters. The organization module 240 can organize the set of data objects in a logical organization (e.g., on a database) or other non-transitory machine-readable storage medium. The organization module 240 can perform operations of weighting, ranking, and other organizational operations on the set of data objects, as explained in more detail below.

The presentation module 250 causes presentation of a plurality of data objects of the set of data objects based on the organization. The presentation module 250 can cause the presentation of the plurality of data objects by transmitting the plurality of data objects and instructions indicative of the organization to the user device 130 or 140. The instructions can cause formatting of the plurality of data objects on the user interface of the user device 130 or 140 according to one or more visualization techniques to present the set of data objects based on the organization. The presentation module 250 can cause the set of data objects to be presented via display on a screen (e.g., in a graphically based representation, a text based representation, or a combination thereof), via sound transmission (e.g., via voice or simulated voice transmission), or any other suitable method for presentation. Where the presentation module 250 presents the set of data objects on the screen of the user device 130 or 140, the presentation module 250 can cause the user device 130 or 140 to display the set of data objects as a set of representative icons or images, where each icon is representative of a data object of the set of data objects. The icons or images can be presented in a list view, a grid view, or any other suitable arrangement of icons or images.

The communication module 260 enables communication for the server machine 110. For example, the communication module 260 can enable communication among the receiver module 210, the generation module 220, the identification module 230, the organization module 240, and the presentation module 250. In some embodiments, the communication module 260 can enable communication among the server machine 110, the user device 130 or 140, and the publication system 120, as well as other systems capable of communicating with the server machine 110, such as via a communications network e.g., the internet).

Figure 3:
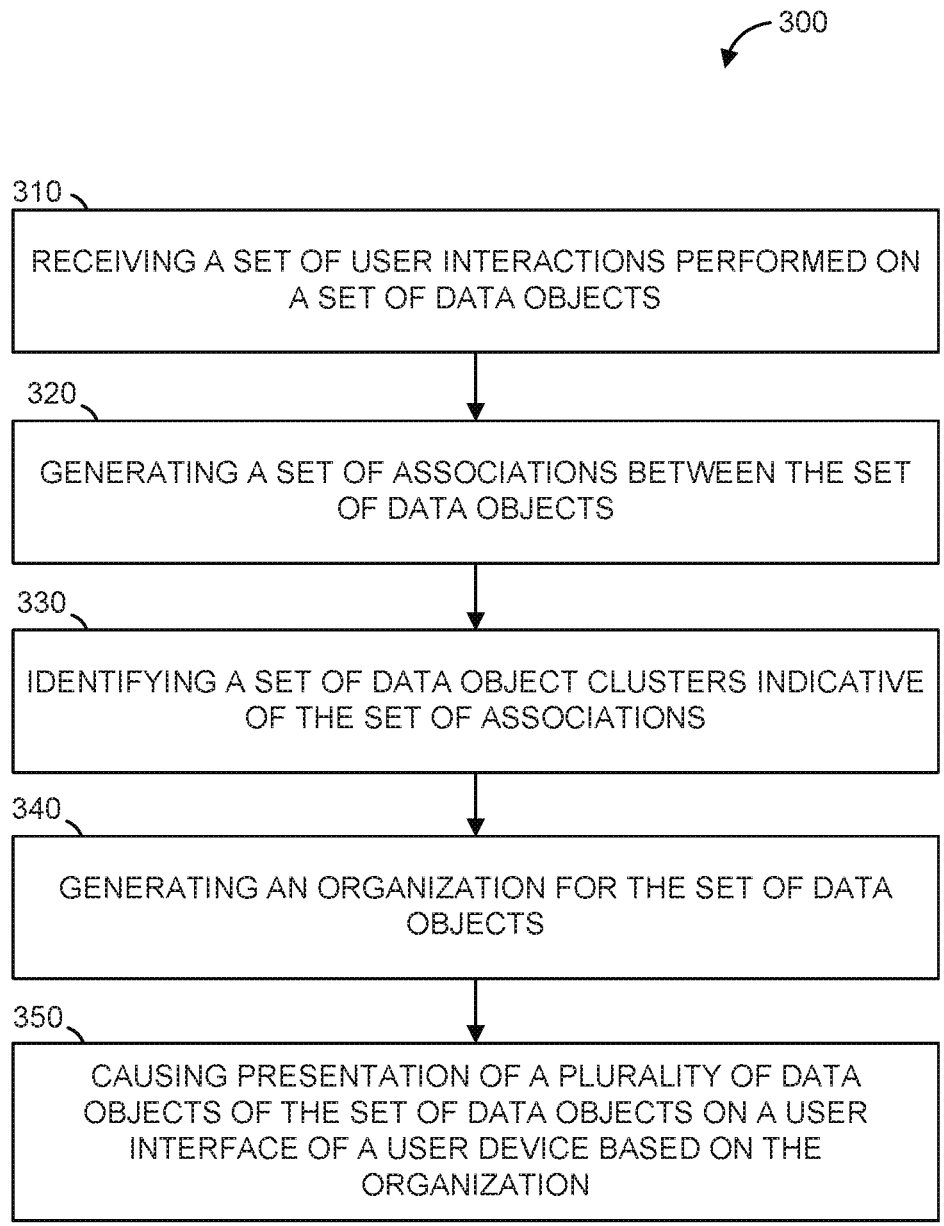
FIG. 3 is a flowchart illustrating operations of a system in performing a method of generating recommendations of a set of data objects based on user interactions with those data objects from a plurality of users, according to some example embodiments.

FIG. 3 is a flowchart illustrating operations of the server machine 110 in performing a method 300 of generating a set of recommendations of a set of data objects based on user interactions of a plurality of users, according to some example embodiments. Operations in the method 300 may be performed by the server machine 110, using modules described above with respect to FIG. 2.

In operation 310, the server machine 110 receives a set of user interactions from a plurality of users. In some embodiments, the receiver module 210 of the server machine 110 configures at least one processor of the server machine 110 to receive the set of user interactions. For example, the receiver module 210 receives an instruction, signal, command, initiating event, interrupt, or other prompt indicative of the set of user interactions, causing the server machine 110 to stop or otherwise suspend one or more processes to process the set of user interactions.

In some embodiments, the set of user interactions are performed on a set of data objects. For example, in the publication system 120, the user interactions can be indicative of a history of users searching, browsing, buying, or otherwise interacting with products, categories, or data indicative of products or categories in the publication system 120. The publication system 120 may store the user interactions in the database 125 or any other suitable non-transitory machine-readable storage medium. In some embodiments, the user interactions may be communicated to the server machine 110 by the publication system 120, where the user interactions are stored in or in conjunction with the publication system 120.

In some embodiments, the server machine 110 may receive user interactions from users, such as the user 132 and the user 142. In these embodiments, data indicative of the user interactions of the users 132 and 142 may be transmitted through the server machine 110 such that the server machine 110 receives the user interactions prior to passing those interactions to an intended recipient. For example, the server machine 110 may initially receive one or more packets of data over the network 150, indicative of user interactions of the users 132 and 142. The server machine 110 can copy, log, or otherwise make records of the user interactions and then transmit the user interactions to the intended recipient, such as the publication system 120. In some embodiments, the server machine 110 can receive a copy of the data indicative of the user interactions, for example, by receiving a copy of the packet sent to an intended recipient of the user interactions. In some embodiments, the server machine 110 may receive data indicative of the user interaction without receiving the user interaction. For example, the server machine 110 may receive a portion of a data packet or some other data indicative of the content of the user interaction, without receiving the complete transmission associated with the user interaction.

Further, in some embodiments, the server machine 110 may be implemented as a portion of the publication system 120. In these embodiments, the user interactions received by the server machine 110 may be received through the communications module 260, the API server 112, or the application server 116.

In operation 320, the generation module 220 of the server machine 110 generates a set of associations between the set of data objects. Each association can be identified between a first data object and a second data object of the set of data objects. The set of associations can be indicative of a user interaction performed on each of the first data object and the second data object by a user of the plurality of users. For example, the server machine 110 can generate the set of associations as a graph, such as a completely connected graph, or a set of graphs, such as a set of completely connected graphs that includes at least one connection between each of the graphs of the set of completely connected graphs. The graphs can be created through an analysis of shared interactions on the data objects, such as through social network analysis, also referred to herein as multi-level social network analysis. The completely connected graphs can represent an ego-centric bipartite social network graph created for each user within the server machine 110 or the publication system 120.

Social network analysis or multi-level social network analysis may be performed in a hybrid approach and include a plurality of differing approaches to content recommendation. For example, the social network analysis processes disclosed herein can employ collaborative filtering based approaches, content filtering based approaches, network based approaches, and hybrid approaches. Examples of collaborative filtering based approaches can include K-nearest neighbor, Pearson Correlation, and singular value decomposition (SVD). Collaborative filtering based approaches can filter potential recommendations based on similarities between profiles created for users, by determining similarities between activities associated with each user profile. Content filtering based approaches can determine similarities among attributes of content being recommended in order to pair together content that may be of interest to an individual. Network based approaches can recommend content using an aggregate behavior of all users within a social network. Hybrid approaches can include any combination of the above-referenced approaches or other suitable approaches hybrid approaches, the above-referenced approaches can be weighted to vary an effectiveness of the recommendation, increase diversity of content recommendations, and decrease risk associated with interrupting a user experience.

In embodiments where the set of data objects is associated in graphs, the server machine 110 may interact with each of the data objects of the set of data objects as a node of one or more graphs. In some embodiments, the server machine 110 may treat the users 132 and 142, or any of the plurality of users, as additional nodes. Associations between data objects of the set of data objects can be drawn between data objects with which a common user has interacted or between users and the data objects with which the an individual user interacts. In embodiments where the data objects are associated in complete graphs, each of the data objects, nodes of a complete graph, of the set of data objects can be connected to as least one other data object, whether directly or through a common association with a user. In this way, in at least some embodiments, the server machine 110 uses the associations connecting each of the data objects as a partial basis for determining recommendations to present to the user 132, based on the user's 132 interaction or the user interactions of the plurality of users, for example. In some embodiments, the generation module 220 of the server machine 110 configures at least one processor of the server machine 110 to generate the set of associations between the set of data objects. As will be described in more detail below, the generation module 220 can include at least one processor which is preconfigured to generate the set of associations between the set of data objects.

In some embodiments, the data object is represented or implemented as a data object file or a data object entry in a database. For example, the data object file or the data object entry may be stored on the database 125 of the publication system 120. The data object file or data object entry may contain metadata or be associated with metadata existing in another file or entry on a database. Each association of the data object can be generated by modifying a portion of metadata included in the data object file or data object entry. Where the metadata is in another file or entry, the metadata of the file or entry may be similarly modified. In some embodiments, a metadata file or entry may be created based on the generation of the association of data objects, instantiating metadata for the data object file or data object entry or replacing a previous metadata file or metadata entry.

The associations can represent interactions between a user and a data object. The associations can include a type of interaction. For example, in conjunction with the marketplace system 180, the type of interaction can include a "watch" of a product listing, a bid, a "buy now", a best offer, and other suitable types of interactions. In some embodiments, data indicative of the interactions can be stored in a transaction log that can be processed to generate a graph of the associations used in clustering operations, described in more detail below. These graphs can be expressed in a plurality of tables. Such tables include a source node index, a target node index, and a transaction table. The source node index can be indicative of the users performing interactions on the data objects. The target node index can be indicative of an item or category of an item, for example. The transaction table can be indicative of specific actions, such as bidding, buying, watching, or other suitable transactions or interaction types with references to both the source node index and the target node index associated with the individual transactions within the transaction table. The transaction table can be weighted (e.g., by tie strength) by the number of transactions between users and items.

In some embodiments, the metadata file or metadata entry can be an association file having a portion of metadata indicative of a relationship between the data object and the association file. The association file can also include data indicative of the associations between data objects, data object files, or data object entries. The association file can be stored on a first non-transitory machine-readable storage medium which also stores the data object files or data object entries, or can be stored on a second non-transitory machine-readable storage medium. In these embodiments, the first and second non-transitory machine-readable storage media may be in communication, such as across the network 150. The first and second non-transitory machine-readable storage medium may additionally include lookup tables, a relational database, or other storage mechanism suitable to contain data relating to related data object files or data object entries of the first and second non-transitory machine-readable storage medium, for example. In embodiments where the metadata indicative of an association or the association file itself is modified, removed, or created, the lookup tables, relation database, or other storage mechanism may also be modified to reflect the change to the association between two data objects.

The portion of metadata in the metadata of the data object file or data object entry, the metadata file, or the metadata entry indicative of each association can include metadata indicative of a number of other data object files or data object entries associated with the data object file or data object entry. For example, the portion of metadata for a first data object can include an integer value indicative of a number of other data object associated with the first data object. For instance, if the first data object has six associations distributed among three other data objects, the portion of metadata indicating the number of data objects associated with the first data object may be an integer value of three, indicating the three other data objects.

In some embodiments, the metadata can include a number of associations between the data object file or data object entry and each of the other data object files or data object entries with which the data object file or data object entry is associated. For example, in the instance above where the first data object is associated with three other data objects (e.g., a second data object, a third data object, and a fourth data object), the metadata including the number of associations for the first data object can include identification values indicative of an identification for each of the second data object, the third data object, and the fourth data object. The metadata can also include an association value corresponding to each identification value. The association value may indicate a number of associations between the first data object and data object of the corresponding identification value. For example, where the two users have interacted with both of the first data object and the second data object, the server machine 110 may determine two associations between the first data object and the second data object. In this example, the association value may be two, for the identification value of the second data Object, in the metadata of the first object. In some embodiments, the metadata can include a total number of associations corresponding to the data object file or data object entry. In the example above, the metadata includes a total number of six for indicating the total number of associations between the first data object and the three other data objects.

In operation 330, the identification module 230 of the server machine 110 identifies a set of data object clusters indicative of the set of associations between data objects of the set of data objects. The set of data object clusters can represent clusters of data objects (e.g., nodes such as items or categories) among the ego-centric bipartite social network graphs created with respect to operation 320. The set of data object clusters can result in a categorized global content network. In some embodiments, the identification module 230 of the server machine 110 can be configured to identify the set of data object clusters. Where the server machine 110 interacts with the data objects in the graph, the server machine can perform a graph clustering portion of multi-level social network analysis. The server machine 110 can identify the set of data object clusters through use of tie strength analysis, a Markov Clustering Algorithm, hybrid approaches, or other suitable methods.

Using the Markov Clustering Algorithm, the server machine 110 can create or identify clusters within the data objects or generally within social media based on a simulation of a stochastic flow within those graphs. The Markov Clustering Algorithm can simulate the stochastic flow of the graph through an iterative process of expansion and inflation. The server machine 110 may thereby identify a distinct set of clusters and suggest related data objects, such as products or categories of the publication system 120, which may be of interest to the user 132. This identification and suggestion of related data objects can be based, at least in part, on the position of the data object within the network. In the example of products and categories of the publication system 120, the suggestion of related products and categories can be based, at least in part, on the product or category's position within the network. Additionally, in the publication system 120 example, the suggestion of related products and categories can be based on the interrelation of the products and categories as defined by the publication system 120, such as relationships defined by a hierarchical category and product organization.

In operation 340, the server machine 110 generates an organization for the set of data objects. In some embodiments, the organization is based on the set of associations and the set of data object clusters. For example, the organization can be generated such that data objects having direct associations are linked closely together with other data objects in a given cluster. The organization can also retain a link between data objects more tangentially related, given their respective positions on the graph. The organization of the set of data objects can be both a logical organization on a database or other non-transitory machine-readable storage medium. In some embodiments, the organization can include weighting and ranking the data objects, as will be explained in more detail below in relation to FIG. 4. Although described with reference to associating, weighting, and ranking of data objects, it will be understood by one skilled in the art that the organization include or be based on any suitable method for organizing data objects within the set of data object clusters.

In some embodiments the organization can be a graphical or user readable organization generated for a graphical user interface. For example, the server machine 110 may group representations of data objects in a graphical display, indicative of the associations between the data objects and representative of data object clusters. In some embodiments, the server machine 110 can also distribute data objects found in a data object cluster across a graphical user interface to avoid granting additional weight to a data object duster within the graphical representation of the organization. In some embodiments, the organization module 240 of the server machine 110 configures at least one processor of the server machine 110 to generate the organization for the set of data objects.

In operation 350, the server machine 110 causes presentation of a plurality of data objects of the set of data objects on a user interface of the user device 130 based on the organization. The plurality of data objects can be a set of recommendations presented to the user 132 based on the set of associations, the set of data object clusters, and a user input (e.g., a query). In some embodiments, the presentation module 250 configures at least one processor of the server machine 110 to cause the presentation of the plurality of data objects in a user interface of the user device 130 or 140. In some embodiments, the presentation module 250 receives the plurality of data objects directly from the organization module 240. Alternatively, the presentation module 250 receives the plurality of data objects from the organization module 240 via the communication module 260.

The presentation module 250 can cause the presentation or display of the plurality of data objects on a user interface (e.g., display or other output device) of the user device 130. In some embodiments, the presentation module 250 transmits the plurality of data objects and instructions indicative of the organization by which to display the plurality of data objects in order to present the plurality of data objects for display. For example, the presentation module 250 passes the plurality of data objects and the instructions indicative of the organization to the communication module 260 which then transmits the plurality of data objects and the instructions indicative of the organization to the user device 130. The instructions can be processor executable instructions that cause the user device 130 to display the plurality of data objects.

Figure 4:
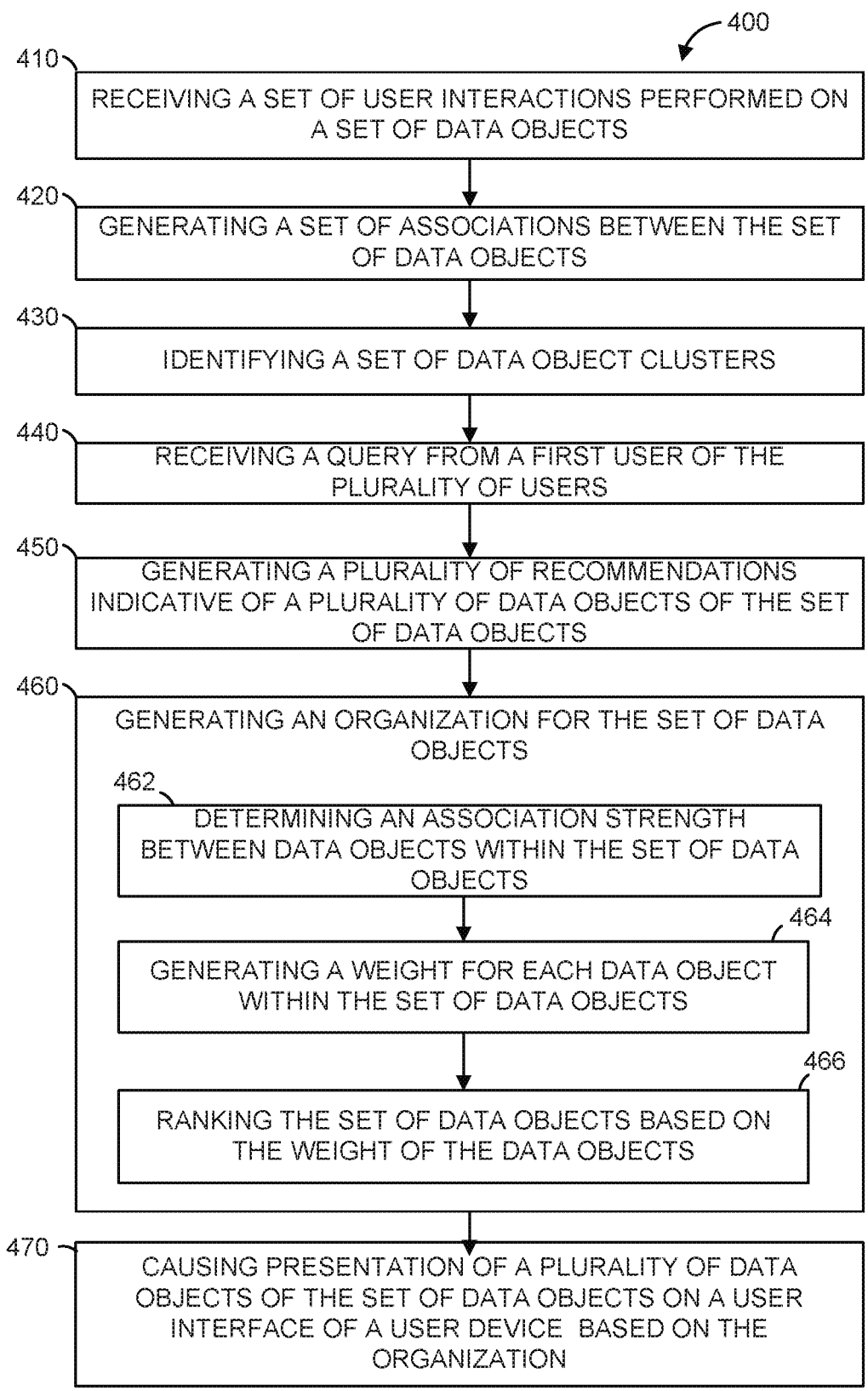
FIG. 4 is a flowchart illustrating operations of a device performing a method of generating recommendations of a set of data objects based on user interactions with those data objects from a plurality of users, according to some example embodiments.

FIG. 4 is a flowchart illustrating operations of the server machine 110 in performing a method 400 of generating a set of recommendations for a set of data objects based on user interactions with those data objects from a plurality of users, according to some example embodiment. Operations in the method 400 may be performed by the server machine 110, using modules described above with respect to FIG. 2.

In operation 410, the receiver module 210 of the server machine 110 receives a set of user interactions from a plurality of users. In some embodiments, the set of user interactions can be performed on a set of data objects. The operation 410 may be performed similarly to operation 310, described above, in some embodiments.

In operation 420, the generation module 220 server machine 110 generates a set of associations between the set of data objects. Each association can be identified between a first data object and a second data object of the set of data objects. The set of associations can be indicative of a user interaction performed on each of the first data object and the second data object by a user of the plurality of users. In some embodiments, the operation 420 can be performed similarly to the operation 320, described above.

In operation 430, the identification module 230 of the server machine 110 identifies a set of data object clusters indicative of associations of the set of associations between data objects of the set of data objects. In some embodiments, the operation 430 can be performed similarly to the operation 330, for example.

In operation 440, the receiver module 210 of the server machine 110 receives a query from a first user of the plurality of users. For example, the receiver module 210 receives an instruction, signal, command, initiating event, interrupt, or other prompt to cause the server machine 110 to initiate action by the generation module 220. A user generated interrupt, representative of the query, can be transmitted to the server machine 110 from the user device 130. Upon receipt of the user generated interrupt, the server machine 110 may cease one or more previously running processes and initiate operation 450.

In operation 450, the generation module 220 of the server machine 110 generates a plurality of recommendations indicative of a plurality of data objects of the set of data objects. The plurality of recommendations corresponds to the query. In some embodiments, the plurality of recommendations are generated based on the set of data object clusters.

For example, the generation module 220 receives the interrupt or prompt from the receiver module 210 and generates the plurality of recommendations. The generation module 220 can communication with the publication system 120 via the API server 112, the web server 114, or the communication module 260 to access the database server 118 and the database 125. The generation module 220 can generate the plurality of recommendations based on a determination of a relation, association, correspondence, or other correlation between the query and the set of data objects within the data object clusters. The generation module 220 may generate the plurality of recommendations based on a combination of keywords or other indicators from the query, a data object cluster corresponding to the query, an association strength of data objects within the data object cluster, an association strength between data objects corresponding to the query, a weight for each data object within a cluster, a weight for each data object corresponding to the query, or other characteristics or factors association with the data objects, data object clusters, and associations.

In operation 460, the organization module 240 of the server machine 110 generates an organization for the set of data objects. In some embodiments, the organization is based on the set of associations and the set of data object clusters. In some embodiments, the operation 460 can be performed similarly to operation 340. The organization can be determined, in part, through tie-strength analysis by determining a tie-strength for each data object included in the set of data objects and placing the data objects in an order in the organization based on the tie strengths. Further, the order can be arranged based on a weighting of the data objects based on the ego-centric bipartite social network graph for the user associated with the query received by the receiver module 210 in operation 440.

In some embodiments, the operation 460 can include additional operations performed by the server machine 110. As shown in FIG. 4, in operation 462, the server machine 110 determines an association strength between data objects within the set of data objects. For example, the server machine 110 determines association strength using tie strength analysis of one or more graphs interconnecting the set of data objects and/or one or more graphs clustering the set of data objects.

The server machine 110 may interact with each of the data objects as nodes of one or more graphs. The server machine 110 can measure tie strength between nodes in a network, such as the one or more graphs, to determine relationships between those nodes. For example, in the publication system 120, if categories of Crafts and Collectibles are both within a cluster of a graph, the tie strength between those categories can be used to generate or otherwise influence a weight for use in determining where each category may appear to the user 132 in a ranked list. In some embodiments, the tie strength between categories or items can be measured or otherwise determined by the number of users with interactions in the respective categories or items. Further, the number of times that any given user interacts with the respective categories or items can be used to inform or adjust the measurement of the tie strength between the respective categories or items.

In some embodiments, the organization module 240 of the server machine 110 can additionally determine tie strengths between two users of the plurality of users, adjusting the tie strength between categories, items, or other data objects, based on the tie strength between the users interacting with those categories, items, or other data objects. For example, tie strengths indicative of interactions of a first user with two or more categories may be weighted differently for a second user than a third user based on a tie strength between the first user and the second user. In such a situation, the server machine 110 can rank, weigh, or otherwise prioritize the tie strength between the two or more categories more heavily for the second user where the tie strength between the first user and the second user is stronger than the tie strength between the first user and the third user. By way of further example, if the user 132 watches twelve items in an Art category, in the marketplace system 180, a category-centric graph between the nodes (e.g., the user 132 and the Art category) can have a weight of twelve. Additionally, an item-centric graph can be created for each user (e.g., the user 132 and the user 142) with weights being determined by a number of interactions each user has had with each item. Interactions can be further weighted to make results more or less expansive for the user.

In some embodiments using one or more graphs, the organization module 240 of the server machine 110 can include users and categories as nodes of the one or more graphs in its determination of the association strength between data objects. For example, the server machine 110 can use an ego-centric social network graph in its determination where the user 132 is the center node. The ego-centric network graph can be used to compute or otherwise determine or generate additional weights to ensure that items or categories with which the user 132 has interacted most frequently or most recently are included in the results returned by the server machine 110, such as the plurality of recommendations, discussed in greater detail below. The server machine 110 can also balance the additional weights determined through the ego-centric social network graph with weights generated in cooperation with other graphs to ensure that the results relating to the ego-centric graph do not dominate the plurality of recommendations.

For example, if the user 132 favorited, or otherwise selected or indicated interest in an item on the publication system 120, such as a camping cook stove, the server machine 110 can include the favorited camping cook stove as well as other popular cook stoves in the plurality of recommendations. The popularity of the popular cook stoves can be based on or indicated by one or more graphs, other than the ego-centric graph, formed through the multi-level social network analysis and the tie strengths of the items in those one or more graphs. However, in at least some embodiments, the returned favorited camping cook stove and other popular cook stoves may not exclusively dominate the plurality of recommendations. For example, other items such as tents, sleeping bags, lanterns, or portable heaters may be equally valid for the user 132, despite the possibility that these items are in disparate categories across the publication system 120. With regard to disparate categories, the disparate categories can be low-level categories within a hierarchically ordered category scheme. Disparate categories can thereby share same or similar top or higher level categories (e.g., camping). For example, when using "camping" as the category, results generated by the server machine 110 can be expansive (e.g., showing multiple different camping related items) but still relevant, by excluding items from unrelated categories such as "jewelry."

In operation 464, the organization module 240 of the server machine 110 generates a weight for each data object within the set of data objects based on the association strength between data objects. In some embodiments, the weight for each data object can be based on the interactions of the user 132 within the publication system 120 and the association strengths indicative of those interactions. Further, the weight can be based on interactions of the user 132 within the marketplace system 180. The weight can also be based on interactions of other users associated or otherwise linked to the user 132 in the social network based on the other users interactions with the publication system 120 or the marketplace system 180.

In operation 466, the organization module 240 of the server machine 110 ranks the set of data objects based on the weight of the data objects within the set of data objects. The ranks of data objects within the set of data objects forms a rank ordered list. The rank ordered list can represent a spectrum of items that may be of interest to the user 132, weighted by the user's 132 prior interactions to facilitate a personalized experience. The rank ordered list can also represent the spectrum of items that may be of interest to the user 132, with the rank ordered list being additionally informed by or based on the interactions of the plurality of users. In some embodiments, the organization can be determined, in part, through tie-strength analysis In operation 470, the presentation module 250 of the server machine 110 causes presentation of a plurality of data objects of the set of data objects on a user interface of the user device 130 based on the organization. In some embodiments, the operation 470 can be implemented similarly to the operation 350. The plurality of data objects presented for display includes the plurality of recommendations from operation 450. Further, in some embodiments, the plurality of recommendations can form a subset of the plurality of data objects presented for display, while the plurality of data objects presented for display also includes data objects not included in the plurality of recommendations.

The plurality of recommendations can include data objects from a plurality of data object clusters of the set of data object clusters. In some embodiments, the plurality of data object clusters can be based on user interactions, from the set of user interactions, associated with the first user. For example, the plurality of data objects presented to the user 132 may be at least in part representative of user interactions of the user 132.

By way of further example, in operation 470, the presentation module 250 of the server machine 110 presents data objects, within the plurality of data objects, with which the user 132 has previously viewed or otherwise interacted. In this way, the server machine 110 can present the user 132 with products from the publication system 120 in which the user has already shown interest or purchased, such as goods which may need to be repurchased due to shelf life, consumption, or the like. In addition to displaying data objects with which the user 132 has already interacted, the server machine 110 can show the plurality of recommendations in the same or similar display, where the plurality of recommendations is generated based on user interactions and relevancy, as determined by the server machine 110 through methods such as a multi-level social network analysis.

Figure 5:
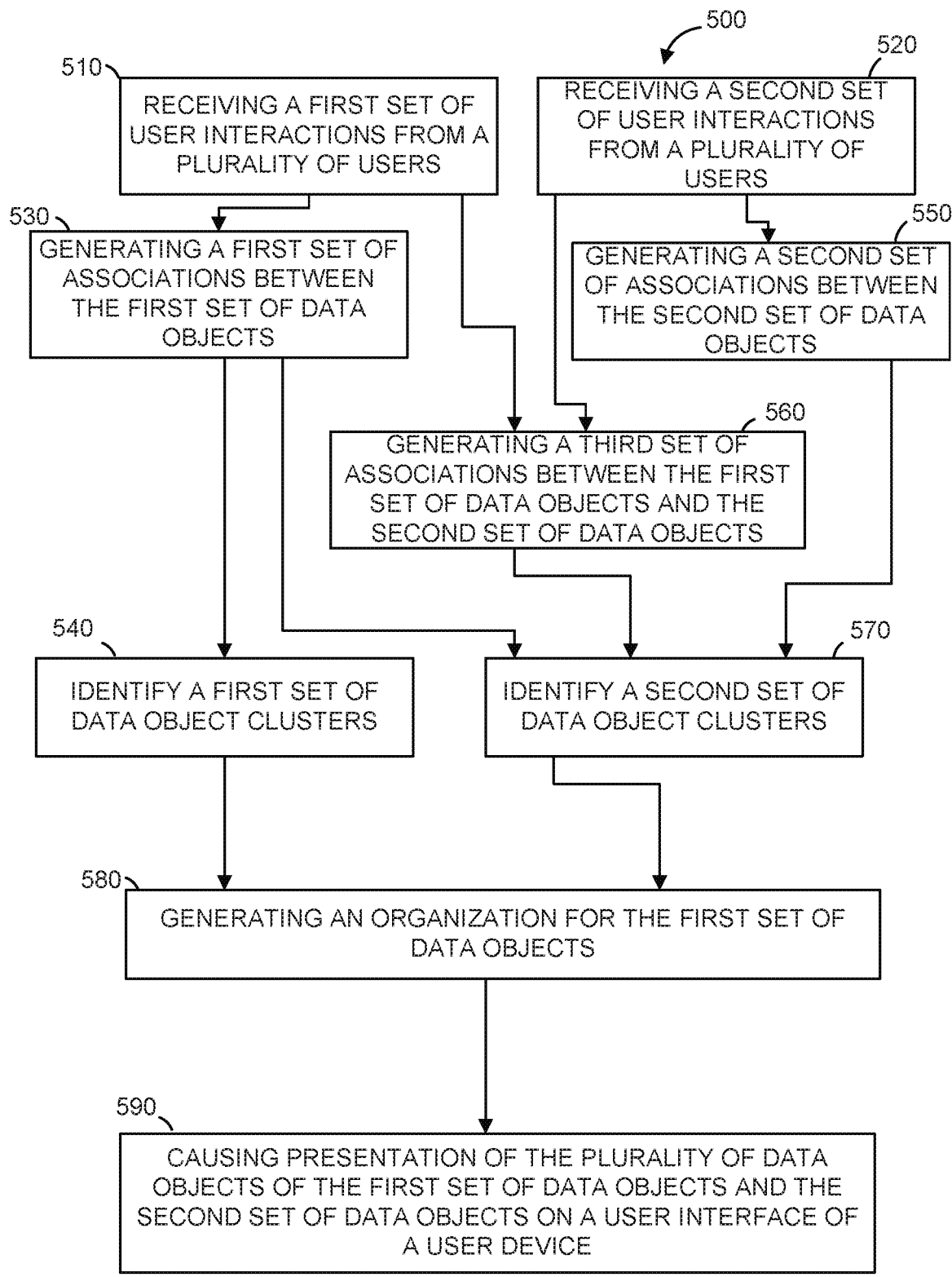
FIG. 5 is a flowchart illustrating operations of a device performing a method of generating recommendations of a set of data objects based on user interactions with those data objects from a plurality of users, according to some example embodiments.

FIG. 5 is a flowchart illustrating operation of the server machine 110 in performing a method 500 of generating a set of recommendations for a set of data objects based on user interactions with those data objects from a plurality of users, according to some example embodiment. Operations in the method 500 may be performed by the server machine 110 using modules described above with respect to FIG. 2.

In operation 510, the receiver module 210 of the server machine 110 receives a first set of user interactions from a plurality of users. The set of user interactions can be performed on a first set of data objects. In some embodiments, the first set of user interactions on the first set of data objects can be indicative of the plurality of users interacting with products or items within the database 125 of the publication system 120. For example, the interaction with these products or items can be the user 132 selecting a link associated with the product or item, favoriting the product or item, sharing the link associated with the product or item, searching for the product or item, purchasing the product or item, bidding on the product or item, or any other suitable user interaction with the data object representative of the product or item. The operation 510 can be implemented similarly to operation 310 or 410, in some embodiments.

In operation 520, the receiver module 210 of the server machine 110 receives a second set of user interactions from the plurality of users. The second set of user interactions can be performed on a second set of data objects. In some embodiments, the second set of data objects can be hierarchically related to the first set of data objects. In some embodiments, the second set of user interactions on the second set of data objects can be indicative of the plurality of users interacting with categories associated with products or items on the publication system 120. For example, similar to the interaction with products or items discussed above, the interaction with the categories can be embodied by the user 132 selecting a link associated with a category or product within a category, sharing the link associated with the category or the link associated with the product found within the category, purchasing the product within the category, searching the category or within the category, or the like.

The server machine 110 or the publication system 120 can retain a log of user interactions for each user. In some embodiments, the receiver module 210 receives sets of historical user interactions from the log for the user 132. For example, the server machine 110, as described above, generates directed or expansive results. The receiver module 210, receiving sets of historical user interactions from the log, can pass sets of user interactions to the generation module 220 which represent varying periods of time and durations of user interactions. For example, if the user 132 repeatedly interacts with camping related items or items within a category of camping during a recent two week period, the receiver module 210 receives sets of historical user interactions from that two week period, or from periods extending beyond the two week period. In this way, where the receiver module 210 receives a set of historical user interactions from the two week period, the server machine 110 can use the set of historical user interactions and adjust weights of the results to generate timely results, at least partially representative of the set of historical user interactions from the two week period.

Where the user 132 has a sparse history of interaction with the server machine 110 or the publication system 120, the receiver module 210 can receive sets of historical user interactions which span a greater period of time (e.g., an entire history of the user 132 interacting with the server machine 110 or the publication system 120. In these embodiments, the receiver module 210 or another module within the server machine 110 makes a determination of whether to receive sets of user interactions from a short recent duration or a longer historical duration. For example, interaction density, the amount of interactions the user 132 has performed on the server machine 110 or the publication system 120, can be used to determine the time period range or duration of user interactions received by the receiver module 210.

In operation 530, the generation module 220 of the server machine 110 generates a first set of associations between the first set of data objects, where each association, of the first set of associations, is identified between a first data object and a second data object of the set of first data objects. In these embodiments, each association is indicative of a user action performed on each of the first data object and the second data object by the user 132 of a plurality of users. The operation 530 can be implemented similarly to the operation 320, for example, generating associations between products or items represented by the first set of data objects. It should be noted that the generation module 220 can generate associations for every user who interacts with any data object with which a source user (e.g., the user 132) interacted for a period of time represented by the set of user interactions. Here, the data object with which the source user interacted can be an item, a category, or any other suitable data object within the publication system 120 or the server machine 110, from which the resulting graphs may be constructed.

In operation 540, the identification module 230 of the server machine 110 identifies a first set of data object clusters indicative of associations of the first set of associations between data objects of the set of data objects. The operation 540 can be implemented similarly to the operation 330 or 430, identifying data object clusters between products or items represented by the first set of data objects.

In operation 550, the generation module 220 of the server machine 110 generates a second set of associations between the second set of data objects. The operation 550 can be implemented similarly to the operation 320, for example, generating associations between categories of the publication system 120 represented by the second set of data objects.

In operation 560, the generation module 220 of the server machine 110 generates a third set of associations between the first set of data objects and the second set of data objects. The operation 560 can be implemented similarly to the operation 320, for example, generating associations between products or items and categories represented by the first set of data Objects and the second set of data objects, respectively.

In operation 570, the identification module 230 of the server machine 110 identifies a second set of data object clusters indicative of associations of the first set of associations, the second set of associations, and the third set of associations between data objects of the first set of data objects and the second set of data objects. The operation 570 can be implemented similarly to the operation 330 or 430, identifying data object clusters between products, items, and categories represented by the first set of data objects and the second set of data objects, respectively.

In operation 580, the organization module 240 of the server machine 110 generates an organization for the first set of data objects, based on the first set of associations and the first set of data object clusters. In some embodiments of operation 580, the server machine 110 can also generate an organization for the second set of data objects based on the second set of associations and the third set of associations. In some embodiments of operation 580, the server machine 110 can generate an organization for the first set of data objects and the third set of data objects based on the first set of associations, the second set of associations, and the third set of associations as well as the first set of object dusters and the second set of object clusters. Operation 580 can be implemented similarly to operation 340 or operation 460. In some embodiments, in operation 580, the organization module 240 of the server machine 110 generates the organization for a set of data objects incorporating the first set of data objects and the second set of data objects.

In operation 590, the presentation module 250 of the server machine 110 causes presentation of the plurality of data objects of the first set of data objects and the second set of data objects on a user interface of the user device 130 based on the organization. In some embodiments, the operation 590 can be implemented similarly to operation 350 or operation 470.

One or more of the methodologies described herein may obviate a need for certain efforts or resources that otherwise would be involved in generating aggregating and relating data objects in a non transitory machine-readable storage medium and translating the relations of the data objects into recommendations for a user, and thereby reduce a number of search iterations or linking or associating operations that a computer system may need to perform, saving processing cycles of the server machine 110, the user device 130 or 140, and the publication system 120. Further, methodologies described herein may generate both expansive recommendations and personalized, goal oriented recommendations based on an analysis of user interactions across a social network. For example, the methods and systems presented herein may perform operations of weighting associations and clusters for relevance to a user. The systems and methods may take into account a plurality of contexts and types of relationships in generating recommendations for users and forming associations between data objects. Efforts expended by a user in researching products, browsing for products, performing shopping activities, and the like may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 6:
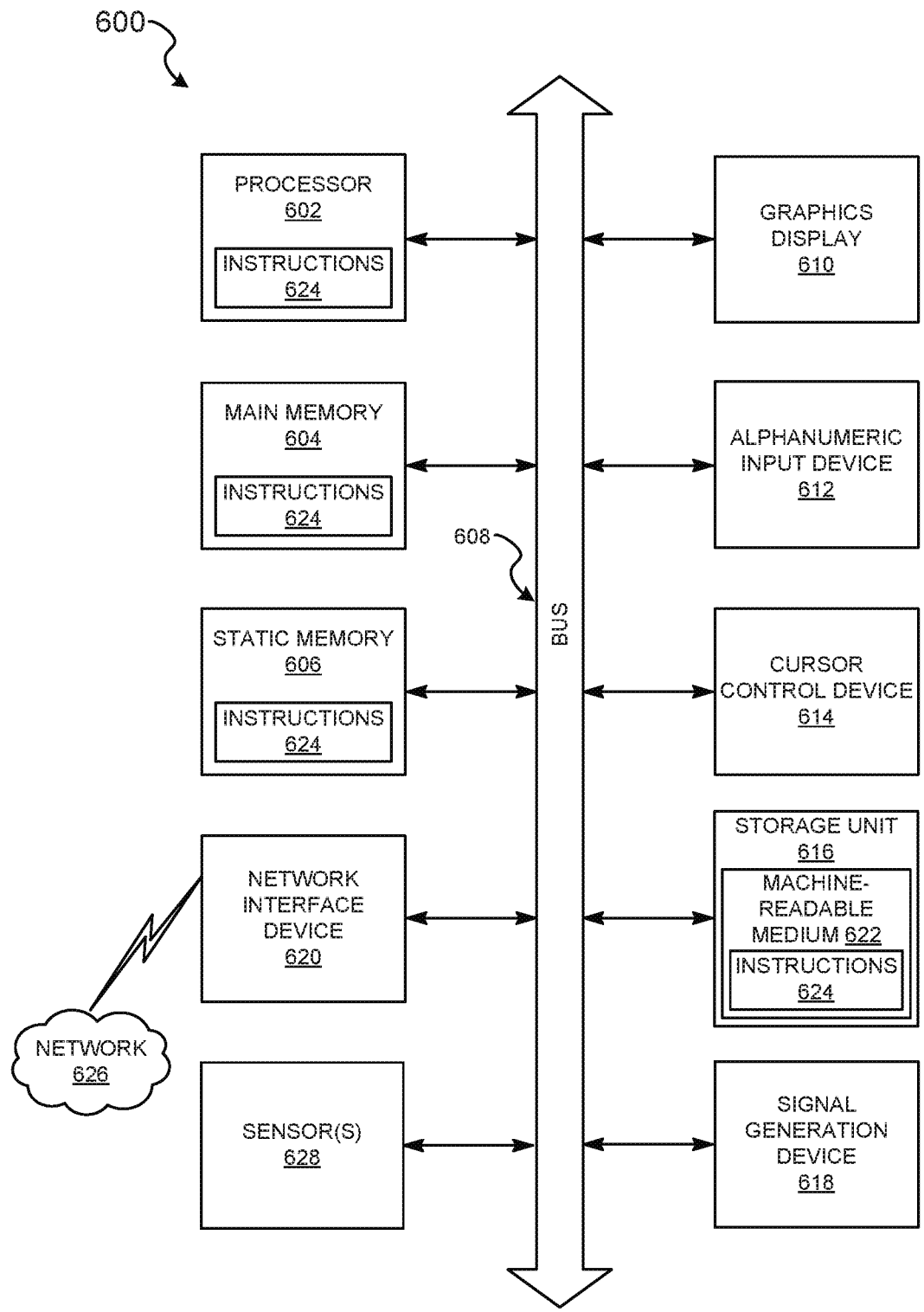
FIG. 6 is a block diagram illustrating components of a machine, according to some example embodiments, able to read instructions from a machine-readable medium and perform any one or more of the methodologies discussed herein.

FIG. 6 is a block diagram illustrating components of a machine 600, according to some example embodiments, able to read instructions 624 from a machine-readable medium 622 (e.g., a non-transitory machine-readable medium, a machine-readable storage medium, a computer-readable storage medium, or any suitable combination thereof) and perform any one or more of the methodologies discussed herein, in whole or in part. Specifically, FIG. 6 shows the machine 600 in the example form of a computer system (e.g., a computer) within which the instructions 624 (e.g., software, a program, an application, an applet, an app, or other executable code) for causing the machine 600 to perform any one or more of the methodologies discussed herein may be executed, in whole or in part. For example, the instructions 624 can be processor executable instructions that, when executed by a processor of the machine 600, cause the machine 600 to perform the operations outlined above.

In alternative embodiments, the machine 600 operates as a standalone device or may be communicatively coupled (e.g., networked) to other machines. In a networked deployment, the machine 600 may operate in the capacity of a server machine or a client machine in a server-client network environment, or as a peer machine in a distributed (e.g., peer-to-peer) network environment. The machine 600 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 624, sequentially or otherwise, that specify actions to be taken by that machine. Further, while only a single machine is illustrated, the term "machine" shall also be taken to include any collection of machines that individually or jointly execute the instructions 624 to perform all or part of any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein.

The machine 600 may further include a graphics display 610 (e.g., a plasma display panel (PDP), a light emitting diode (LED) display, a liquid crystal display (LCD), a projector, a cathode ray tube (CRT), or any other display capable of displaying graphics or video). The machine 600 may also include an alphanumeric input device 612 (e.g., a keyboard or keypad), a cursor control device 614 (e.g., a mouse, a touchpad, a trackball, a joystick, a motion sensor, an eye tracking device, or other pointing instrument), a storage unit 616, an audio generation device 618 (e.g., a sound card, an amplifier, a speaker, a headphone jack, any suitable combination thereof, or any other suitable signal generation device), and a network interface device 620.

The storage unit 616 includes the machine-readable medium 622 (e.g., a tangible and non-transitory machine-readable storage medium) on which are stored the instructions 624 embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered machine-readable media (e.g., tangible and non-transitory machine-readable media). The instructions 624 may be transmitted or received over the network 626 (or the network 150) via the network interface device 620. For example, the network interface device 620 may communicate the instructions 624 using any one or more transfer protocols (e.g., Hypertext Transfer Protocol (HTTP)).

In some example embodiments, the machine 600 may be a portable computing device, such as a smart phone or tablet computer, and have one or more additional input components (e.g., sensors 628 or gauges). Examples of the additional input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 622 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 624 for execution by the machine 600, such that the instructions 624, when executed by one or more processors of the machine 600 (e.g., processor 602), cause the machine 600 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Furthermore, the tangible machine-readable medium is non-transitory in that it does not embody a propagating signal. However, labeling the tangible machine-readable medium as "non-transitory" should not be construed to mean that the medium is incapable of movement, but rather the medium should be considered as being transportable from one physical location to another. Additionally, since the machine-readable medium is tangible, the medium may be considered to be a machine-readable device.

Figure 7:
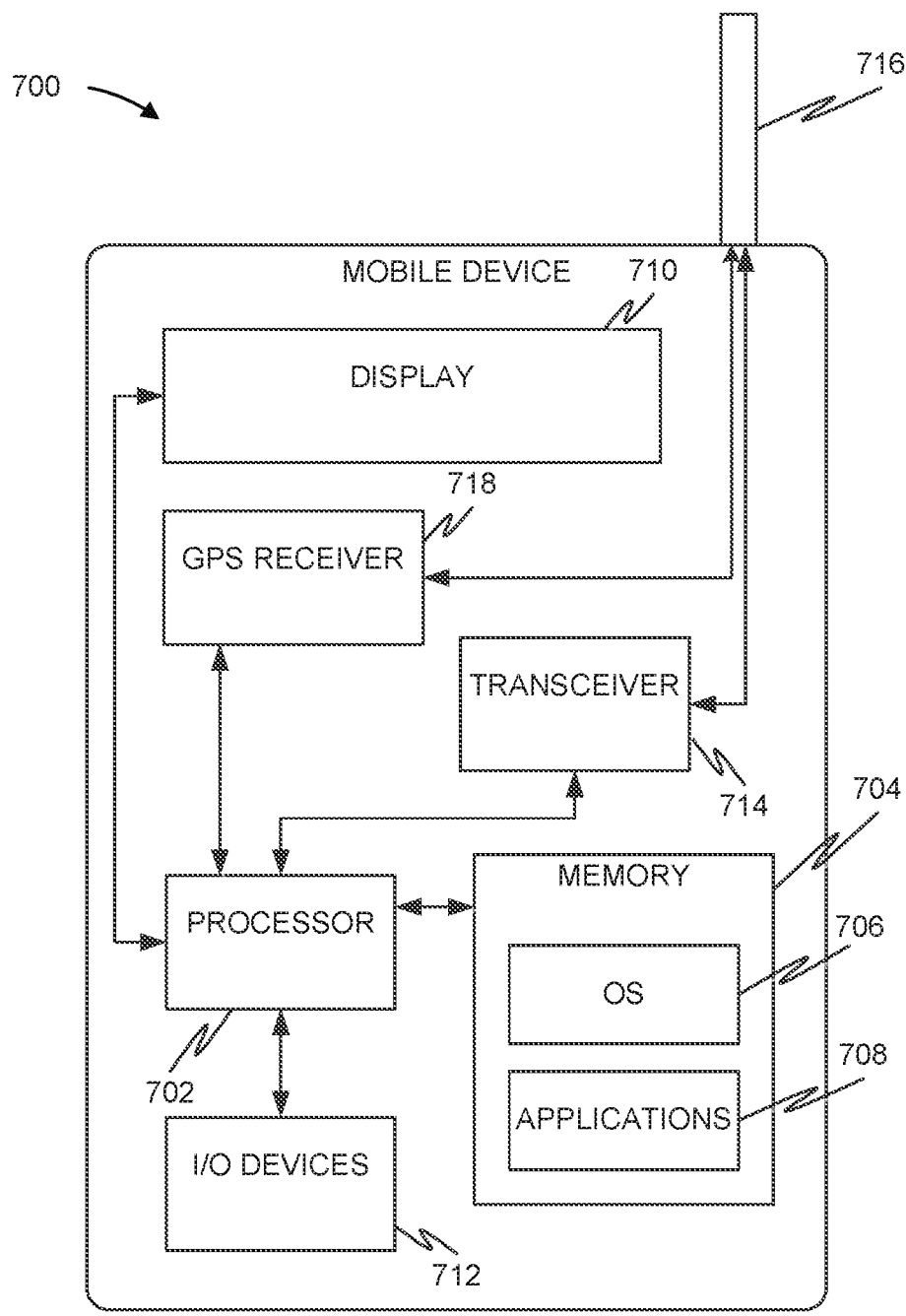
FIG. 7 is a block diagram illustrating components of a mobile device according to some example embodiments, able to read instructions from a machine-readable medium and perform any one or more of the methodologies discussed herein.

FIG. 7 is a block diagram illustrating a mobile device 700, according to some example embodiments. The mobile device 700 can be an implementation of the user device 130 or 140. In some embodiments, the mobile device 700, in communication with the server machine 110 can perform some of the methodologies described herein, and can provide input from the user 132 or 142 to the server machine 110. For example, the mobile device 700 may be an implementation of the user device 130. The mobile device 700 can include a processor 702. The processor 702 can be any of a variety of different types of commercially available processors suitable for mobile devices 700 (for example, an XScale architecture microprocessor, a Microprocessor without Interlocked Pipeline Stages (MIPS) architecture processor, or another type of processor). A memory 704, such as a random access memory (RAM), a Flash memory, or other type of memory, is typically accessible to the processor 702. The memory 704 can be adapted to store an operating system (OS) 706, as well as application programs 708, such as a mobile location enabled application that can provide location based services to a user. The processor 702 can be coupled, either directly or via appropriate intermediary hardware, to a display 710 and to one or more input/output (I/O) devices 712, such as a keypad, a touch panel sensor, a microphone, and the like. Similarly, in some example embodiments, the processor 702 can be coupled to a transceiver 714 that interfaces with an antenna 716. The transceiver 714 can be configured to both transmit and receive cellular network signals, wireless data signals, or other types of signals via the antenna 716, depending on the nature of the mobile device 700. Further, in some configurations, a GPS receiver 718 can also make use of the antenna 716 to receive GPS signals.

The mobile device 700 can be configured to perform at least a portion of any one or more of the methodologies discussed herein. For example, the memory 704 of the mobile device 700 may include instructions comprising a portion of one or more of the receiver module 210, the generation module 220, the identification module 230, the organization module 240, and the presentation module 250. For example, one or more of the modules described above can be distributed between the server machine 110 and the mobile device 700 to perform one or more of the operations outlined above with respect to each module. The modules can configure the processor 702 of the mobile device 700 to perform one or more of the operations outlined above with respect to each module. In some embodiments, the mobile device 700 and the machine 600 can each store at least a portion of the modules discussed above and cooperate to perform the methods described above, as will be explained in more detail below.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
   receiving a set of user interactions from a plurality of users, the set of user interactions performed on a set of data objects within a system;
   generating a set of associations between the set of data objects based on the set of user interactions, the set of associations being distributed among a plurality of network graphs that include some or all of the set of user interactions performed on the set of data objects within the system, each network graph created for a different one of the plurality of users;
   identifying a set of data object clusters indicative of the set of associations, the set of data object clusters forming a categorized global content network;
   receiving a query from a first user of the plurality of users;
   generating a plurality of recommendations indicative of a plurality of data objects of the set of data object clusters; and
   causing presentation of at least a portion of the plurality of recommendations on a user interface of a user device.

2. The method of claim 1, further comprising:
   generating an organization for the set of data objects, the organization based on the set of associations between the set of data objects and the set of data object clusters; and
   causing presentation of the portion of the plurality of recommendations based on the organization for the set of data objects.

3. The method of claim 2, wherein the organization is generated based on a tie strength analysis of associations among data objects of the set of data objects within the set of data object clusters and a weighting applied to the organization, the weighting generated based on associations between the first user and the set of data objects.

4. The method of claim 2, wherein the organization is generated based on a first tie strength analysis of associations among data objects of the set of data objects, a second tie strength analysis of associations among data objects of the set of data objects and a subset of users of the plurality of users, and a third tie strength analysis of the first user with the subset of users.

5. The method of claim 1, further comprising:
   generating an organization for the set of data objects, the organization based on the set of associations between the set of data objects and the set of data object clusters;
   generating one or more graphical representations of the organization of the set of data objects, the one or more graphical representations representative of the organization and the set of data object clusters; and
   causing presentation of the portion of the plurality of recommendations based on the one or more graphical representations.

6. The method of claim 5, wherein causing presentation of the portion of the plurality of recommendations based on the one or more graphical representations further comprises:
   distributing recommendations, associated with data objects of an object cluster, across the user interface based on weights for each data object within the object cluster.

7. The method of claim 1, wherein the plurality of network graphs include nodes representative of at least a subset of data objects of the set of data objects and at least a subset of users of the plurality of users.

8. A system, comprising:
one or more processors; and
a non-transitory machine-readable storage medium coupled to the one or more processors, the non-transitory machine-readable storage medium including instructions that, when executed by the one or more processors, cause the one or more processors to perform operations comprising:
receiving a set of user interactions from a plurality of users, the set of user interactions performed on a set of data objects within the system;
generating a set of associations between the set of data objects based on the set of user interactions, the set of associations being distributed among a plurality of network graphs that include some or all of the set of user interactions performed on the set of data objects within the system, each network graph created for a different one of the plurality of users;
identifying a set of data object clusters indicative of the set of associations, the set of data object clusters forming a categorized global content network;
receiving a query from a first user of the plurality of users;
generating a plurality of recommendations indicative of a plurality of data objects of the set of data object clusters; and
causing presentation of at least a portion of the plurality of recommendations on a user interface of a user device.

9. The system of claim 8, wherein the operations further comprise:
generating an organization for the set of data objects, the organization based on the set of associations between the set of data objects and the set of data object clusters; and
causing presentation of the portion of the plurality of recommendations based on the organization for the set of data objects.

10. The system of claim 9, wherein the organization is generated based on a tie strength analysis of associations among data objects of the set of data objects within the set of data object clusters and a weighting applied to the organization, the weighting generated based on associations between the first user and the set of data objects.

11. The system of claim 9, wherein the organization is generated based on a first tie strength analysis of associations among data objects of the set of data objects, a second tie strength analysis of associations among data objects of the set of data objects and a subset of users of the plurality of users, and a third tie strength analysis of the first user with the subset of users.

12. The system of claim 8, wherein the operations further comprise:
generating an organization for the set of data objects, the organization based on the set of associations between the set of data objects and the set of data object clusters;
generating one or more graphical representations of the organization of the set of data objects, the one or more graphical representations representative of the organization and the set of data object clusters; and
causing presentation of the portion of the plurality of recommendations based on the one or more graphical representations.

13. The system of claim 12, wherein causing presentation of the portion of the plurality of recommendations based on the one or more graphical representations further comprises:
distributing recommendations, associated with data objects of an object cluster, across the user interface based on weights for each data object within the object cluster.

14. The system of claim 8, wherein the plurality of network graphs include nodes representative of at least a subset of data objects of the set of data objects and at least a subset of users of the plurality of users.

15. A non-transitory machine-readable storage medium comprising processor executable instructions that, when executed by a processor of a machine, cause the machine to perform operations comprising:
receiving a set of user interactions from a plurality of users, the set of user interactions performed on a set of data objects within a system;
generating a set of associations between the set of data objects based on the set of user interactions, the set of associations being distributed among a plurality of network graphs that include some or all of the set of user interactions performed on the set of data objects within the system, each network graph created for a different one of the plurality of users;
identifying a set of data object clusters indicative of the set of associations, the set of data object clusters forming a categorized global content network;
receiving a query from a first user of the plurality of users;
generating a plurality of recommendations indicative of a plurality of data objects of the set of data object clusters; and
causing presentation of at least a portion of the plurality of recommendations on a user interface of a user device.

16. The non-transitory machine-readable storage medium of claim 15, wherein the operations further comprise:
generating an organization for the set of data objects, the organization based on the set of associations between the set of data objects and the set of data object clusters; and
causing presentation of the portion of the plurality of recommendations based on the organization for the set of data objects.

17. The non-transitory machine-readable storage medium of claim 16, wherein the organization is generated based on a tie strength analysis of associations among data objects of the set of data objects within the set of data object clusters and a weighting applied to the organization, the weighting generated based on associations between the first user and the set of data objects.

18. The non-transitory machine-readable storage medium of claim 16, wherein the organization is generated based on a first tie strength analysis of associations among data objects of the set of data objects, a second tie strength analysis of associations among data objects of the set of data objects and a subset of users of the plurality of users, and a third tie strength analysis of the first user with the subset of users.

19. The non-transitory machine-readable storage medium of claim 15, wherein the operations further comprise:
generating an organization for the set of data objects, the organization based on the set of associations between the set of data objects and the set of data object clusters;
generating one or more graphical representations of the organization of the set of data objects, the one or more graphical representations representative of the organization and the set of data object clusters; and causing presentation of the portion of the plurality of recommendations based on the one or more graphical representations.

20. The non-transitory machine-readable storage medium of claim 19, wherein causing presentation of the portion of the plurality of recommendations based on the one or more graphical representations further comprises:

distributing recommendations, associated with data objects of an object cluster, across the user interface based on weights for each data object within the object cluster.

* * * * *